United States Patent [19]

Isayev et al.

[11] Patent Number: 4,728,698
[45] Date of Patent: Mar. 1, 1988

[54] LIQUID CRYSTAL FIBER-REINFORCED POLYMER COMPOSITE AND PROCESS FOR PREPARING SAME

[75] Inventors: Avraam Isayev, Akron, Ohio; Michael J. Modic, Houston, Tex.

[73] Assignee: University of Akron, Akron, Ohio

[21] Appl. No.: 901,573

[22] Filed: Aug. 29, 1986

Related U.S. Application Data

[63] Continuation-in-part of Ser. No. 773,044, Sep. 6, 1985, abandoned.

[51] Int. Cl.$^4$ .............................................. C08L 69/00
[52] U.S. Cl. .................................... 525/439; 264/108; 264/177.13; 264/331.21; 525/165; 525/177; 525/425; 525/434; 525/437; 525/444; 525/466
[58] Field of Search ............... 525/439, 466, 165, 177, 525/425, 437, 444; 428/1

[56] References Cited

U.S. PATENT DOCUMENTS

| 4,332,759 | 6/1982 | Ide | 264/108 |
| 4,460,735 | 7/1984 | Froix | 525/439 X |
| 4,468,364 | 8/1984 | Ide | 264/176 R |

FOREIGN PATENT DOCUMENTS 0030417 6/1981 European Pat. Off. .
2008598 6/1979 United Kingdom .

*Primary Examiner*—Theodore E. Pertilla
*Attorney, Agent, or Firm*—Oldham, Oldham & Weber Co.

[57] ABSTRACT

Novel self-reinforced polymer composites of a base polymer with a melt processable liquid crystal polymer are prepared according to this invention. The base polymer is a flexible chain polymer, e.g. a conventional thermoplastic. Polycarbonate is a particularly suitable base polymer. The liquid crystal polymer is melt processable, that is, it has a melting point and exhibits anisotropic properties in the melt phase. Wholly aromatic copolyesters are particularly suitable. Mixing is carried out at a temperature at which both the base polymer and the liquid crystal are melt processable, i.e., at a temperature at which the base polymer flows readily and the liquid crystal polymer is above its melting point. The products of this invention comprise about 2 to 20 percent by weight of liquid crystal polymer, which is in the form of essentially unidirectionally oriented continuous fibers primarily in the range of about 1 to 10 micrometers in diameter, distributed in a matrix of the base polymer. The polymer composites of this invention have high tensile strength in both the fiber direction and the transverse direction, and also have high modulus, satisfactory elongation, good impact strength, and good high temperature properties.

13 Claims, No Drawings

LIQUID CRYSTAL FIBER-REINFORCED
POLYMER COMPOSITE AND PROCESS FOR
PREPARING SAME

CROSS REFERENCE TO RELATED APPLICATION

This application is a continuation-in-part of copending application of Avraam Isayev and Michael J. Modic, Ser. No. 773,044, filed Sept. 6, 1985, now abandoned.

FIELD OF THE INVENTION

This invention relates to processes and polymer compositions and processes for making the same, and more particularly to novel self-reinforced polymer composites comprising a base polymer and a liquid crystal polymer which serves as the reinforcing agent and to processes for making the same.

BACKGROUND ART

Fiber-reinforced polymer composites are well known and widely used. Polymers of improved strength and increased stiffness can be obtained by the use of an appropriate reinforcing fiber. Probably the most widely used reinforcing fibers are glass, carbon and aramid (or "Kevlar" which is a registered trademark of the E. I. du Pont de Nemours and & Co., Wilmington, Del.). Composites in which aramid is the reinforcing fiber are known for their light weight, high strength and stiffness, resistance to stretch, vibration damping and resistance to damage. Aramid-reinforced composites are found in wide use, particularly the aircraft and aerospace industries, and in a variety of sports equipment. Fibrous reinforcements can be in the form of either long or short fibers.

A difficulty encountered in the production of fiber-reinforced polymer composites is the high mixing energy required to mix or blend the base polymer with the reinforcing fiber. This is due largely to the fact that all the common reinforcing materials are solids. Furthermore, composites having long, continuous strands of reinforcing fibers cannot be formed easily in conventional mixers, so that special methods are required in order to manufacture such composites.

The base polymers used in making reinforced polymer composites such as those described above are generally conventional thermoplastics, such as polyethylene, polypropylene, ethylene-propylene copolymers, polyvinyl chloride (PVC), styrene and copolymers thereof, polyamides, polycarbonates, and polyesters such as polyethylene terephthalate. These polymers are thermoplastic and are either amorphous or semi-crystalline. They may be called flexible chain polymers, since individual monomers units in the polymer chain are free to rotate with respect to each other so that the polymer chain may assume a random shape.

Another class of polymers, quite different in properties from the amorphous and semi-crystalline thermoplastics are the crystalline polymers. These may be classified into three groups as follows: (1) polymers which are crystalline in the solid state but not in the liquid state, (2) polymers which are crystalline in solution in an appropriate solvent but which do not have a crystalline melt phase, and (3) polymers which have a crystalline melt phase.

The first group of crystalline polymers which are known as those which are anisotropic (i.e., crystalline) in the solid phase and which either decompose before melting or which have melting points but are isotropic in the liquid phase. Such materials are reported, for example, in the opening paragraph of U.S. Pat. No. 4,083,829.

The second group are liquid crystalline materials which are optically anisotropic in solution but which are not melt processable, i.e., they decompose without melting and they show no glass transition temperature. These are referred to as "lyotropic" materials and are often referred to as lyotropic "liquid crystal" polymers. Such materials are described, for example, in Hwang et al, *J. Macromol. Sci.-Phys.*, B 22(2), 231–257 (1983) and in *Polymer Engineering And Science*, Mid October 1983, Vol. 23, No. 14, pages 789–791. Composites of such polymers with flexible chain polymers are also described in these references.

The third group of crystalline polymers are those which are anisotropic and highly oriented, even in the liquid phase. These materials have well defined melting temperatures, and are melt processable. These materials may be characterized as thermotropic and are often called thermotropic "liquid crystal" polymers. Such polymers have rod-like structure even in the melt state. Liquid crystal polymers of this type are described, for example, in U.S. Pat. Nos. 3,991,014; 4,067,852; 4,083,829; 4,130,545; 4,161,470; 4,318,842; and 4,468,364.

U.S. Pat. Nos. 3,991,014 and 4,318,842 cited supra also disclose that the compounds described therein can be used in belts of automobile tires and for plastic reinforcement without giving any details.

Shaped articles can be formed from melt processable liquid crystal polyesters as has been described in the art. Both fibers and shaped articles made of liquid crystal polyesters are reported to have high tensile strength. This is true in the case of shaped articles if the tensile strength measurement is made in the direction of fiber orientation. However, shaped articles made of liquid crystalline polyesters in the absence of reinforcement have been found to have an unacceptably low tensile strength measured in a direction transverse to the direction of fiber orientation. Thus, although the literature reports that shaped articles of liquid crystalline polyesters can be made by conventional methods, such as injection molding, such methods inevitably lead to the production of articles having poor strength in the transverse direction. Special shaping methods are therefore necessary. In addition, the high cost of such materials precludes their use for making shaped articles on more than a limited scale.

European Patent Application Publication No. 0030417, published June 17, 1981, describes methods for improving the processability of melt processable base polymers which comprises adding a minor amount (typically about 10 to 20 percent by weight) of a thermotropic polymer which is compatible with the base polymer. As described in the publication, a thermotropic polymer is a polymer capable of forming an anisotropic melt when heated to a particular temperature range. The anisotropic melt forming polymer (or "liquid crystal" polymer) must be compatible with the base polymer, which typically is a conventional polymer such as polyolefin, polystyrene, polyester (e.g. polyethylene terephthalate), polyphenylene oxide or copolymer thereof, or polycarbonate. No claim for achieving improved physical properties as compared to the base polymer is made, and the data show that the physical properties of the blends are no better than and in some cases are worse than those of the corresponding pure base polymers.

U.K. Published Patent Application No. 2,008,598 discloses a polymer composition comprising 20 percent or less, based on the total weight of polymer, of a rigid polymer, and a second polymeric material having flexible molecular chains. The rigid polymer is dispersed in the second polymeric material as microscopic particles of one micrometer or less.

U.S. Pat. No. 4,460,735 describes polymer blends comprising approximately 5 to 75 percent by weight, based on the total weight of the blend, of a polycarbonate and 25 to 95 percent of a melt processable wholly aromatic polyester. These blends or composites show somewhat improved mechanical properties over what one would expect from the rule of mixture. A tendency toward decreasing strength and modulus is seen at lower concentrations of the wholly aromatic polyester.

Only recently has the first commercial melt processable or thermotropic liquid crystal polymer (LCP) been introduced, even though such polymers have been described extensively in patent and technical literature. Such a polymer was introduced commercially by Dartco under the trademark "Xydar" according to *Modern Plastics,* December 1984, pages 14 and 16.

The properties of Dartco's "Xydar" are described in further detail in a paper presented at the 43rd Annual Technical Conference of the Society of Plastics Engineers, Inc., April 29–May 2, 1985, and published in *Antec'85 Plastics,* pages 769–772.

There is a need for new polymer composites which have properties comparable to those of presently known light weight, high strength polymer composites but which can be prepared at lower cost.

DISCLOSURE OF THE INVENTION

It is an object of this invention to provide novel light weight, high strength polymer composites.

Another object is to provide polymer composites which can be made more economically than the reinforced plastics now on the market.

A further object of this invention is to provide an economical process for making polymer composites.

These and other objects will be apparent from the specification which follows.

Novel polymer compositions according to this invention are prepared by mixing from about 80 to about 98 percent by weight of a base polymer with from about 2 to about 20 percent by weight of a melt processable liquid crystal polymer (LCP) which is incompatible with the base polymer and which has a melting point within the process temperature range of the base polymer, so that there is an overlapping temperature range at which both polymers are processable, and extruding the resulting mixture in the melt phase.

The novel polymer compositions are self-reinforced polymer composites in which the liquid crystal polymer is in the form of long continuous oriented fibers which are formed in situ in a matrix of the base polymer. The amount of liquid crystal polymer must be sufficiently low so that the liquid crystal polymer fibers are formed in situ when a melt phase mixture of the base polymer and the liquid crystal polymer is extruded. The base polymer is a flexible chain polymer which may be amorphous or semi-crystalline.

The novel polymer composites of this invention have improved physical properties compared to those of the base polymer with no liquid crystal polymer present.

BEST MODE FOR CARRYING OUT THE INVENTION

The required starting materials for preparing the novel polymer composites of this invention are a base polymer and a melt processable liquid crystal polymer, i.e. a polymer which forms an anisotropic melt, as previously described.

The base polymer is a flexible chain polymer, i.e., one in which successive units of the polymer chain are free to rotate with respect to each other, so that the polymer chain can assume a random shape. The base polymer is either amorphous or semi-crystalline. Suitable base polymers for this invention include conventional thermoplastic polymers such as polyethylene, polypropylene, ethylene-propylene copolymers, polystyrene and styrene copolymers, polyvinyl chloride (PVC), polyamide (nylon), polyesters such as polyethylene terephthalate, polyetheretherketone, polyphenylene sulfide, polyetherimide, polybutylene terephthalate, and polycarbonate. Elastomers, both cured and thermoplastic, thermoset resins, and reactive or crosslinkable polymers, may also be used as the base polymers.

The melt processable liquid crystal polymer, or anisotropic melt-forming polymer, is a polymer which exhibits an anisotropy (i.e. "crystallinity") in the melt phase. This polymer is a thermotropic material.

A further requirement of the liquid crystal polymer (or LCP) starting material is that it must be incompatible with the base polymer. That is, addition of the liquid crystal polymer to the base polymer does not affect the glass transition temperature of the base polymer.

A still further requirement of the liquid crystal polymer is that its processing temperature range and the processing temperature range of the base polymer must overlap. Thus a melt processable liquid crystal polymer is processable only at temperatures above its melting point (and below the temperature at which the polymer decomposes or degrades), it follows that the melting point of the LCP must be somewhere within the process temperature range of the base polymer. The processing temperature range of the base polymer, as is well known, is simply the temperature at which the polymer is soft enough to be processed in conventional extrusion and mixing equipment without undergoing decomposition or degradation. The minimum processing temperature of the base polymer is well above the glass transition temperature as well known.

One suitable class of liquid crystal polymer starting materials are the wholly aromatic polyesters such as those described in U.S. Pat. Nos. 3,991,014; 4,067,852; 4,083,829; 4,130,545; 4,161,470; 4,318,842; and 4,468,364.

The liquid crystal polymer must be matched or paired with the base polymer so that the two have overlapping processing temperatures. That is, the melting point of the liquid crystal polymer must be within the processing temperature range of the base polymer. Thus, not every suitable LCP starting material can be used with every suitable base polymer.

One series of particularly suitable polymer compositions or composites according to the present invention are those made from a polycarbonate as the base polymer and a wholly aromatic polyester thermotropic liquid crystal polymer having a melting point of about 275° C. and supplied by Celanese Research Company, Summit, N.J. under the designation "Vectra A950" (formerly "LCP-2000"). This polymer is believed to consist of about 25-27 mole percent of 6-oxy-2-naphthoyl moieties and about 73-75 mole percent of p-oxybenzoyl moieties, as described in example 4 of U.S. Pat. No. 4,468,364 and in G. W. Calundann et al, "Anisotropic Polymers, Their Synthesis and Properties", reprinted from The Robert A. Welch Conferences on Chemical Research, XXVI Synthetic Polymers, Nov. 15-17, 1982, Houston, Texas, pp 247-291 (see especially pp. 263-265).

Another series of particularly suitable polymer compositions or composites according to this invention are those made from a polyetherimide as the base polymer and the aforedescribed "Vectra A950" as the liquid crystal polymer.

The amount of liquid crystal polymer in the final product is preferably from about 2 to about 20 percent by weight, especially from about 2 to about 15 percent by weight, based on the combined weight of the base polymer and the liquid crystal polymer. Larger amounts of liquid crystal polymer are generally not desirable. Products in which the liquid crystal polymer content exceeds 20 percent are more costly and generally have poorer physical properties than those in which the LCP content is in the range of 2 to 20 percent. LCP fibers generally do not form when the LCP content is substantially above 20 percent. The threshold above which fiber formation no longer occurs depends somewhat on the base polymer and the mixing conditions used. For example, fibers did not form in polycarbonate/LCP blends containing 25 percent or more of LCP when a static mixer was used.

Particularly preferred polycarbonate/LCP composites according to this invention are those containing about 2 to about 15 percent by weight of LCP.

Additional materials are not required but may be present. Thus, it is within the scope of the invention to prepare a mixed composite polymer by inclusion of an additional reinforcing fiber, such as glass, carbon, or aramid, in addition to the liquid crystal polymer. The additional reinforcing fiber may be incorporated into either the base polymer or the liquid crystal polymer. The additional reinforcement provided by the additional fiber is not necessary in most cases, but where a very high stiffness (or very high strength) reinforced polymer composite is desired, such can be attained according to the present invention without the high loadings of conventional reinforcing fiber required in presently known polymer/fiber composites.

Other additives, such as pigments and fillers, coupling agents, flame retardants, lubricants, mold release agents, plasticizers and ultraviolet stabilizers, may be mixed with the base polymer and liquid crystal polymer as desired. The use of such additives is well known in the polymer processing art.

The base polymer and the liquid crystal polymer are mixed at a temperature at which both are melt processable by any suitable means which will assure thorough mixing of the two polymers. Any additional ingredients which are desired in the final product are also mixed in at this time. The mixing apparatus may be, for example, single screw extruder in series with a suitable static mixer, a single screw which has a design that promotes improved mixing (as for example a design as shown on page 220 of Modern Plastics Encyclopedia 1984-1985, published by McGraw-Hill, Inc., New York, N.Y., 1984) or a twin screw extruder. Other mixing apparatus will be apparent to those skilled in the art.

Preferred mixing apparatus includes an extruder, static mixer and extrusion die through which blends of the base polymer and the liquid crystal polymer are extruded. Good results have been obtained by using a single screw extruder having four (4) heating sections in series with a heated six-element Koch mixer (a static mixer), with an adapter between the extruder and the Koch mixer, and a discharge die having a 1/16 inch (in diameter) opening on the outletside of the Koch mixer.

Good results have also been obtained with a twin screw extruder. The twin screw extruder used herein (in FIG. 5) was a ZSK 30 twin screw extruder, having corotating twin screws which rotate at 200 rpm sold by Werner and Pfleiderer Corp., Ramsey, N.J. The twin screw extruder used had five independently controllable heating zones in series. In experiments herein, the first zone was maintained at about 280° C., and the other four zones were manintained at about 310° to about 330° C.

The base polymer, liquid crystal polymer, and any additional ingredients are fed in solid form to the mixing apparatus. The base polymer and the liquid crystal polymer as fed are conveniently in the form of pellets.

The processing temperature is the temperature at which both polymers are melt processable, i.e. a temperature at which the base polymer is sufficiently soft to be processed in ordinary mixing apparatus and at which the liquid crystal polymer is above its melting point. The ingredients are brought up to processing temperature at the beginning of the mixing operation and are thereafter maintained in the desired temperature range. In the case of the preferred apparatus, the ingredients are brought up to temperature near the feed end of the single screw extruder and are thereafter maintained at appropriate processing temperature by appropriate controls of the various independently adjustable heating sections.

The product polymer composition is a self-reinforced polymer composite in which the base polymer is the matrix and the liquid crystal polymer is in the form of essentially unidirectionally oriented continuous fibers or strands, oriented in the direction of extrusion. Fiber diameters are predominantly less than 10 microns, primarily in the range of about 1 micron to about 10 microns, although fibers of other diameters can be obtained. The polymer composite is characterized as self-reinforced because the LCP fibers are formed in situ during the mixing process rather than being fed to the mixing apparatus in solid form. The proportions of ingredients in the polymer composite are essentially the same as in the feed.

The product polymer composite may be cooled by any suitable means (for example quenching in water), and further processed as desired. For example, the polymer composite may be pelletized and then formed into shaped articles, tapes, films of fibers. This shaping may be accomplished by conventional means such as extrusion, injection molding, etc.

Products of the present invention have high tensile strength in both the direction of orientation of the liquid crystal polymer fibers (longitudinal direction) and in the transverse direction. As data in Table III-A show, the yield strength of an injection molded sample of LCP-reinforced polycarbonate containing 10 percent by weight LCP was more than one-third greater than the yield strength of an injection molded sample of pure polycarbonate. Extrudate samples of 10 percent LCP-reinforced polycarbonate had about twice the yield strength of extrudates of pure polycarbonate, as shown in Table II-A. This represents a major and unexpected increase in yield strength, especially since unreinforced (or pure) polycarbonate has a high yield strength. The modulus of 10 percent LCP-reinforced polycarbonate was more than twice that of pure polycarbonate in both extrudate and injection molded samples (Tables II-A and III-A, respectively). It will also be noted that the yield strengths and moduli of LCP-reinforced polycarbonate extrudates of this invention are appreciably higher than the theoretical lower bound values, which are the values which would be predicted by straight line interpolation between the values for pure polycarbonate and those for pure LCP.

In addition, the polymer composites of this invention are light in weight and have satisfactory elongation and impact strength. They also have high temperature stability when a high temperature stable base polymer is used.

Polyetherimide/LCP composites according to this invention have been found to have higher modulus and higher impact strength than pure polyetherimide. Improvement in impact strength is more noticeable in polyetherimide/LCP composites than in polycarbonate/LCP composites As pointed out earlier, it is essential that the amount of liquid crystal polymer present in the polymer blend be low enough so that LCP fiber formation takes place. When the amount of LCP is so great that fiber formation does not take place, the resulting blend is brittle. For example, polycarbonate/LCP blends containing either 25 percent of 50 percent by weight of LCP and prepared as described in Example 2 herein, were found to be brittle and to exhibit very low elongation to break. Other tensile properties were not measurable. This is in contrast to polycarbonate/LCP blends containing either 2.5, 5 or 10 percent LCP, also prepared as described in example 2; those blends had a fiber structure and exhibited superior physical properties.

Polymer composites of this invention in general may be used for the same purposes as other fiber-reinforced polymer composites having the same base polymer. Thus, for example, polycarbonate/LCP composites of this invention are particularly useful in automotive vehicle applications (e.g. instrument panels, interior components of mass transit vehicles, etc.) and in the electrical and electronic industries. These polymers are particularly useful in high performance applications.

The polymer composites of this invention are particularly useful for applications where aramid-reinforced polymers are now used. Such applications include, for example, various aircraft, aerospace, and marine applications.

The polymer composites of this invention are notably strong in both tensile strength and impact strength compared to the unreinforced base polymers. The physical properties are generally comparable to aramid-reinforced polymer composites having the same base polymer. The polymer composites of this invention are also much stronger in the transverse direction and much cheaper to make than liquid crystal polymers. Thus, shaped articles made of the polymer composites of this invention can be formed by conventional methods and have high strength in all directions not just in the direction of fiber orientation. In contrast, shaped articles formed from pure liquid crystal polymers require special shaping methods; otherwise the articles are quite weak in directions at right angles to the direction of melt flow during shaping, even though they are quite strong in the direction of melt flow during shaping.

A further advantage of polymer composites of this invention is that mixing energy required is much lower than the mixing energy required to form conventional fiber-reinforced polymer composites. This is because the base polymer and liquid crystal polymer are in the liquid or molten state, while in the case of conventional fiber reinforcement, the reinforcing fiber is in solid form and only the base polymer is in the fluid state. A related advantage of the present process and the resulting product is that it is possible to obtain composites in which the reinforcing fibers are in the form of long continuous strands. In contrast, conventional reinforcing fibers must be chopped into short lengths if the composite is to be prepared in conventional mixing apparatus. Special methods of composite formation are required if a composite with long continuous reinforcing fibers is desired.

EXAMPLES

This invention will now be further described in detail with reference to the specific examples that follow. It will be understood that these examples are by way of illustration of the invention and not by way of limitation of the scope thereof.

The base polymer used in examples 1-4 was a polycarbonate sold under the name "Lexan" 141-101 by General Electric Company Schemectady, N.Y. This material had a weight average molecular weight ($M_w$) of about 29,000.

The base polymer used in example 5 was a polyetherimide sold under the name "Ultem 100" by General Electric Company, Schenectady, N.Y.

The liquid crystal polymer used in all examples was a thermotropic polymer supplied by Celanese Research Company, Summit, N.J. under the designation "Vectra A950" (formerly LCP-2000). This polymer had a melting point of 275° C. and is believed to consist of about 25-27 mole percent of 6-oxy-2-naphthoyl moieties and 73-75 mole percent of p-oxybenzoyl moieties.

The apparent viscosity ratio of polycarbonate melt to LCP-2000 melt was about 7 at 310° C. and shear rate 1500 sec.$^{-1}$. The apparent viscosity ratio of polyetherimide melt to LCP-2000 melt was about 60 at 310° C. and shear rate of 100 sec.$^{-1}$. This ratio increases as the shear rate increases.

Example 1

This example illustrates the melt spinning of fibers from a thermotropic liquid crystalline polymer in order to determine the theoretically highest tensile properties of the self-reinforced composite.

Pellets of the liquid crystal polymer were melted and packed in the barrel of an Instron capillary rheometer which was equipped with an isothermal chamber. The capillary rheometer was heated to 280° C. in one run and 310° C. in another run. The isothermal chamber was kept 10° C. below the capillary barrel temperature. The capillary die had a diameter 0.042 inch and a L/D ratio of 28.9. The isothermal chamber had an air gap of 2.8 inch. The polymer was extruded at a speed of 0.15 in/min., and taken up on a bobbin giving a take-up ratio of 37.5. The tensile properties (i.e., Young's modulus E, tensile strength $\sigma_B$, and elongation at break $\epsilon_B$) of the fibers were then measured on a Monsanto tensile tester (Model T-500) with a crosshead speed of 0.18 in/min.

and a one inch sample length at room temperature. Results of tensile property experiments are given in Table I.

TABLE I
TENSILE PROPERTIES OF LCP MELT SPUN FIBERS

| T (°C.) | E (GPa) | $\sigma_B$ (MPa) | $\epsilon_B$ (%) |
|---|---|---|---|
| 280 | 34.9 | 498.4 | 2.96 |
| 310 | 47.3 | 881.0 | 3.00 |

These modulus and tensile strength data will be used in order to compare the experimentally determined mechanical properties of extrudates and molded parts prepared from the blends with those predicted by a composite theory.

Example 2

This example illustrates the melt blending of a thermotropic liquid crystalline polymer (LCP-2000) with polycarbonate ("Lexan" 141-101).

The two polymers were blended in concentrations between 2.5-50 percent by weight of LCP to polycarbonate in batches of 1.0 Kg. In addition, two comparison runs, one with pure polycarbonate and the other with pure liquid crystal polymer, were carried out. Pellets of each polymer were blended together manually and then placed in a vacuum oven at 110° C. for 24 hours. The blended pellets were removed from the oven and fed to the inlet end of a mixing apparatus which comprised, in series from inlet to outlet, a ¾" Killion single screw extruder (screw L/D 24:1) driven by a one horsepower motor, a 6-element Koch Model No. KMB-150 static mixer, and a 1/16 inch (in diameter) discharge die, with transition sections between the extruder and the static mixer and between the static mixer and the die. The screw extruder had three temperature zones, with Zone 1 being at the feed section and Zone 3 at the screw tip. The temperature of Zone 1 was controlled at 540° F. (282° C.) whereas the other two zones were kept at 590° F. (310° C.). The Koch static mixer temperature was controlled by 4 temperature controllers, all maintained at 590° F. (310° C.). The screw extruder was operated at 30 RPM. The shear rate was 225 sec.$^{-1}$. As the blend exited the static mixer, it was cooled in a room temperature water bath located just after the exit region. Cylindrical specimens of length 2.0" were cut from the continuous extrudate of blends for tensile property measurements as per Example 1.

Table II gives Young's modulus E, yield stress $\sigma_Y$, ultimate strength $\sigma_B$, and elongation at break $\epsilon_B$ of the extrudates.

TABLE II
TENSILE PROPERTIES OF EXTRUDATES

| Wt. % LCP | E (GPa) | $\sigma_Y$ (MPa) | $\epsilon_B$ (%) | $\sigma_B$ (MPa) |
|---|---|---|---|---|
| 0 | 1.62 | 77.2 | 170.7 | 255.3 |
| 2.5 | 2.21 | 85.6 | 33.6 | 104.1 |
| 5.0 | 2.52 | — | 7.49 | 104.1 |
| 10.0 | 3.68 | — | 7.03 | 153.5 |
| 100 | 4.06 | — | 11.37 | 151.5 |

In Table II, "0" and "100" in the "Wt. % LCP" column (the first and last lines, respectively) denote pure polycarbonate and pure liquid crystal polymer, respectively.

Good tensile properties were observed in extrudates containing 2.5, 5 and 10 percent by weight LCP. Extrudates containing 25 or 50 percent by weight LCP, on the other hand had no LCP fiber structure and were brittle. They had very low elongation at break, and the other tensile properties could not be measured.

When extrusion conditions besides those illustrated in example 2 can be used, extrudates having good tensile properties were obtained by extrusion at 280° C., for example. Again, good tensile properties were found only in blends containing 2.5, 5 or 10 percent LCP; blends containing 25 or 50 percent LCP were brittle. Shear rate can be varied unduly, by changing the diameter of the extrusion die, and good properties are obtained over a wide range of shear rates.

A composite theory developed for continuous fiber-reinforced composite materials has been used in order to calculate the upper and lower bounds of modulus and yield stress of the blends. See for example L. Mascia, "Thermoplastics: Materials Engineering", Chapter 4, Applied Science Publishers, London, 1982. For the samples in which yield stress has not been observed, tensile strength values have been used in calculations.

The maximum theoretical values (upper bounds) are indicated by the equations:

$$E_c = E_m(1-\phi_f) + E_f\phi_f$$

$$O_c = O_m(1-\phi_f) + \sigma_f\phi_f$$

where:
$E_c$ = Young's modulus of the composite
$\sigma_c$ = Yield stress of the composite
$E_m$ = Young modulus for the matrix material
$E$ = Modulus for the LCP fibers
$\phi_f$ = Volume fraction of fibers
$\sigma_m$ = Yield stress of the matrix material
$\sigma_f$ = Strength of the LCP fibers The upper bound represents the maximum reinforcement that would occur if LCP melt spun fibers as per Example 1 were present in the extrudates. The lower bound represents the reinforcement that would occur if LCP extrudate were the reinforcing material. Table II-A below compares the actual values of the modulus, yield strength (or stress) (shown in Table II) with the maximum theoretical values.

TABLE II-A
ACTUAL VS MAXIMUM THEORETICAL TENSILE PROPERTIES

| | Young's Modulus (GPa) | | | Yield Strength (MPa) | | |
|---|---|---|---|---|---|---|
| | | Theoretical | | | Theoretical | |
| Wt. % LCP | Actual | Lower Bound | Upper Bound | Actual | Lower Bound | Upper Bound |
| 0 | 1.63 | 1.63 | 1.63 | 77.2 | 77.2 | 77.2 |
| 2.5 | 2.21 | 1.71 | 2.54 | 85.6 | 78.7 | 93.9 |
| 5.0 | 2.52 | 1.81 | 3.51 | 104.1 | 80.3 | 110.5 |
| 10.0 | 3.68 | 2.01 | 5.41 | 153.9 | 83.3 | 143.2 |
| 100 | 4.06 | 4.06 | 47.3 | 151.6 | 151.6 | 881.0 |

In Table II-A above, the lower bound and upper bound properties, respectively, of pure (100 percent) LCP represent the properties of LCP extrudate and LCP fiber, respectively. Actual properties of 100 percent LCP are those of LCP extrudate.

It can be seen from Table II-A that the blends show properties approaching those of the theoretically determined maximum reinforcement. This proves that fiber reinforcement must be taking place in the mixing apparatus.

Example 3

This example illustrates the injection molding of the blended polymers in order to obtain a self-reinforcing composite, Blends of LCP and polycarbonate as specified in Example 2 were chopped up into rods of approximate length of 1.50". These rods were then fed to a BOY 15S reciprocating screw injection molding machine with a maximum shot size of 36 cm$^3$. The following process conditions were used for molding of all the blends:

| | |
|---|---|
| Zone 1 temperature | 310° C. |
| Zone 2 temperature | 310° C. |
| Nozzle temperature setting | 60% |
| Clamping force | 15 tons |
| Injection pressure | 2000 psi (max.) |
| Screw speed | 150 RPM |
| Mold temperature | 95° C. |
| Back pressure | 0 psi |
| Injection time | 5 sec. |
| Close time | 25 sec. |
| Open time | 1 sec. |

Various constant volumetric flow rates have been employed for all the blends. The molded parts were 2.5" diameter, 0.050" thick end-gated disks. Samples of size 2.0"×0.083"×0.050" from the molded parts were cut parallel and perpendicular to the flow direction by using a diamond saw. Tensile properties were measured as per Example 1. Table III gives measured Young's modulus, yield stress and ultimate strength values, measured both parallel to and perpendicular to the direction of fiber orientation. Each data entry in Table III gives values for both the parallel and perpendicular directions, the former being given first.

TABLE III
TENSILE PROPERTIES OF INJECTION MOLDED DISKS

| Wt. % LCP | E(GPa) | ε(%) | σ(MPa) | σ$_B$(Ma) |
|---|---|---|---|---|
| 0 | 1.63/1.55 | 73.5/68.1 | 59.6/55.4 | 93.8/80.3 |
| 2.5 | 2.74/2.14 | 40.3/13.2 | 71.7/— | 73.1/65.9 |
| 5.0 | 2.96/1.99 | 41.1/16.6 | 78.1/— | 85.4/61.8 |
| 10.0 | 3.44/2.30 | 30.3/11.0 | 81.4/— | 86.8/67.2 |
| 25.0 | 2.13/1.98 | 2.9/1.4 | —/— | 43.5/21.8 |
| 50.0 | 2.52/1.77 | 1.4/0.7 | —/— | 25.6/21.2 |
| 100 | 6.52/1.32 | 7.71/17.6 | —/— | 178.7/64.7 |

Data in Table III show that specimens contuining 2.5×10 percent LCP were superior in every physical property measured than those containing either 25 or 50 percent LCP.

A composite theory as described in Example 2 was used to determine the upper and lower bounds of the modulus and yield stress in the direction parallel to flow in the molded parts prepared from the blends. Table III-A below shows that yield strength values of the blends tend towards the upper bound. This indicates that fiber reinforcement occurs.

TABLE III-A
ACTUAL VS. MAXIMUM THEORETICAL TENSILE PROPERTIES

| | Young's Modulus (GPa) | | | Yield Strength (MPa) | | |
|---|---|---|---|---|---|---|
| | | Theoretical | | | Theoretical | |
| Vol. % LCP | Actual | Lower Bound | Upper Bound | Actual | Lower Bound | Upper Bound |
| 0 | 1.63 | 1.63 | 1.63 | 59.6 | 59.6 | 59.6 |
| 2.5 | 2.74 | 1.73 | 2.57 | 71.7 | 61.9 | 76.2 |
| 5.0 | 2.96 | 1.83 | 3.52 | 78.1 | 64.4 | 93.2 |
| 10.0 | 3.44 | 2.03 | 5.38 | 81.4 | 65.5 | 127.2 |
| 100 | 6.52 | 6.52 | 47.3 | 178.7 | 178.7 | 881. |

Lower bound and upper bound properties of 100 percent LCP in TABLE III-A represent properties of molded LCP and LCP fiber, respectively. The "actual" data for 100 percent LCP are those of a molded disk, with measurement in the parallel direction.

An increase in Young's modulus and yield stress in the transverse direction has also been found. This leads to more isotropic and higher strength parts.

Example 4

This example illustrates the technique of Scanning Election Microscopy (SEM) used to determine if the LCP formed continuous fibers within the polycarbonate matrix and therefore producing a self-reinforcing composite.

Samples of the blends after both processing steps described in Examples 2 and 3 were investigated to determine the structure of the blends.

Rods of the blends obtained from Example 2 were cold fractured in liquid nitrogen and glued using quick-drying epoxy to SEM stands which were modified by drilling ⅛" diameter holes approximately ¼" deep in the stands. These holes supported the rods vertically so that the fractured surface could be viewed. Each sample stand was coated with gold using an SPI Sputter Coater. These samples were then observed using a JEOL JSM-U3 Scanning Electron Microscope.

The fractured surfaces of samples from Example 3 were observed by SEM after testing per Example 1. Samples of strips were mounted on SEM stands by double-sided adhesive tape. These samples were then coated and observed as described above.

It was found that the LCP formed long continuous fibers of 2-5 microns in diameter within the polycarbonate matrix in the blends with up to 10% LCP. These fibers are well distributed across the surface of the extrudate. These fibers appeared nearly continuous in length. Similar results were found in the injection molded samples. No fiber structure was observed in blends containing 25 percent or 50 percent LCP.

Example 5

Blends of polyetherimide ("Ultem 1000", made by General Electric Company, Schenectady N.Y.) and liquid crystal polymer (the same as that used in examples 1 to 4) were prepared. The dry polymers in pellet form were charged to a ZSK 30 twin screw extruder, sold by Werner and Pfleiderer Corp. of Ramsey, N.J. This extruder had two corotating screws, both rotated at 200 rpm, and five heating zones. The first zone (at the inlet end) was maintained at 280° C., the other zones at either 310° or 330° C. The polymer blend was extruded as thin strands, which were quenched with water at ambient temperature. The quenched strands were pelletized. The pellets were fed to a Newbury 405 injection molding machine which was operated under the following process conditions:

| | |
|---|---|
| Barrel temperature | 325° C. |
| Nozzle temp. setting | 100% |
| Mold temperature | 150° C. |
| Screw speed setting | 4.5 |
| Injection speed setting | 5 |
| Injection pressure | 900 psi |
| Back pressure | 200 psi |
| Injection time | 4 sec. |
| Cycle time | 30 sec. |

Samples of the extruded blends described herein were observed in a Scanning Electron Microscope (SEM) model ISI-SX-40 International Scientific instruments) and were found to be in the form of fibers of predominantly 1 to 3 microns in diameter. These fibers were oriented essentially in the direction of extrusion, were well distributed across the surface of the extrudate, and were nearly continuous in length.

Injection molded samples of each polymer blend were subjected to impact stress-strain and tensile tests.

Impact tests were carried out according to ASTM method D 235 C, using dumbell shaped samples, 6.3 cm in length and having notches 0.125 inch (about 0.32 cm) in width, and using a 2.0 lb. pendulum. Impact strengths, in foot pounds per inch of notch, were found to be as given in Table V-A below.

Young's modulus (in GPa) was measured using a Monsanto tensile tester, Model T-500, on mini tensile bars (0.625×0123×0.06 inch) from the Instron capillary rheometer (0.075 inch diameter×0.625 inch in height).

TABLE V-A

| Wt. % LCP | Twin Screw Temp | Impact Strength | Young's Mod. |
|---|---|---|---|
| 0 | 310° C. | 1.1 | 3.64 |
| 5 | 310° C. | 1.27 | 4.1 |
| 10 | 310° C. | 1.13 | 4.38 |
| 10 | 330° C. | 1.22 | 4.2 |
| 20 | 310° C. | 0.96 | 4.52 |
| 30 | 310° C. | 0.80 | 4.6 |

Data in Table V-A show that specimens containing 5 or 10 percent LCP had significantly greater impact strength and Young's modulus than either of those formed from pure polyetherimide with no LCP present. Those containing 30 percent LCP had lower impact strength than pure polyetherimide samples. "Twin Screw Temp." in Table V-A denotes the extrusion (or barrel) temperature in each zone except the first.

While in accordance with the patent statues, a preferred embodiment and best mode has been presented, the scope of the invention is not limited thereto, but rather is measured by the scope of the attached claims.

What is claimed is:

1. A process for preparing a self-reinforced polymer composite comprising a thermoplastic flexible chain base polymer and a melt processable liquid crystal polymer which is incompatible with the base polymer, which comprises extruding and mixing a base polymer with from about 2 to about 20 percent by weight based on the combined weight of the base polymer and the liquid crystal polymer of a melt processable liquid crystal polymer under mixing conditions effective to give a polymer composite in which the liquid crystal polymer is present in the form of essentially unidirectionally oriented fibers in a matrix of said base polymer at a temperature at which both polymers are melt processable, and recovering a self-reinforced polymer composite comprising said base polymer and said liquid crystal polymer, said liquid crystal polymer being in the form of continuous essentially unidirectionally oriented fibers in a matrix of said base polymer and said composite having greater ultimate strength and modulus in the direction of fiber orientation than in the direction perpendicular thereto.

2. A process according to claim 1 in which said base polymer is a polycarbonate.

3. A process according to claim 1 in which said base polymer is polyetherimide.

4. A process according to claim 1 in which the mixing temperature is above the melting point of the liquid crystal polymer.

5. A process according to claim 1 in which the liquid crystal polymer is a wholly aromatic polyester.

6. A process according to claim 1 in which said base polymer is a polycarbonate and said liquid crystal polymer is a wholly aromatic polyester.

7. A process according to claim 1 in which the polymer composite is formed into a shaped articles, tape, film or fiber.

8. A self-reinforced polymer composite comprising:
    a thermoplastic flexible chain base polymner, and about 2 to about 20 percent by weight based on the combined weight of the base polymer and the liquid crystal polymer of a melt processable liquid crystal polymer which is incompatible with said base polymer,
    said liquid crystal polymer being in the form of essentially unidirectionally oriented fibers which are formed in situ in a matrix of said base polymer and said composite having greater ultimate strength and modulus in the direction of fiber orientation than in the direction perpendicular thereto.

9. A polymer composite according to claim 8 in which said base polymer is a polycarbonate.

10. A process according to claim 1 in which said mixing includes passing a mixture of said base polymer and said liquid crystal polymer through a static mixer.

11. A process according to claim 1 in which said mixing includes passing a mixture of said base polymer and said liquid crystal polymer through a twin screw extruder.

12. A polymer composite according to claim 8 in which said base polymer is polyetherimide.

13. A polymer composite according to claim 8 in which said liquid crystal polymer is a wholly aromatic polyester.

* * * * *

UNITED STATES PATENT AND TRADEMARK OFFICE
CERTIFICATE OF CORRECTION

PATENT NO. : 4,728,698
DATED : Mar. 1, 1988
INVENTOR(S) : Avraam Isayev et al.

It is certified that error appears in the above—identified patent and that said Letters Patent is hereby corrected as shown below:

Column 10 line 26, the equation should read, $$\sigma_c = \sigma_m(1-\phi_f) + \sigma_f \phi_F$$

Column 11, line 48, "continuing" should be --containing--.
Column 11, lin 49, "2.5 x 10" should be --2.5-10--.
Column 14, line 31, "articles" should be --article--.
Column 14, line 34, "polymner" should be --polymer--.

Signed and Sealed this

Ninth Day of June, 1992

Attest:

DOUGLAS B. COMER

Attesting Officer

Acting Commissioner of Patents and Trademarks